April 19, 1938.  N. V. SMITH  2,114,507
GREASE GUN
Filed Sept. 19, 1931
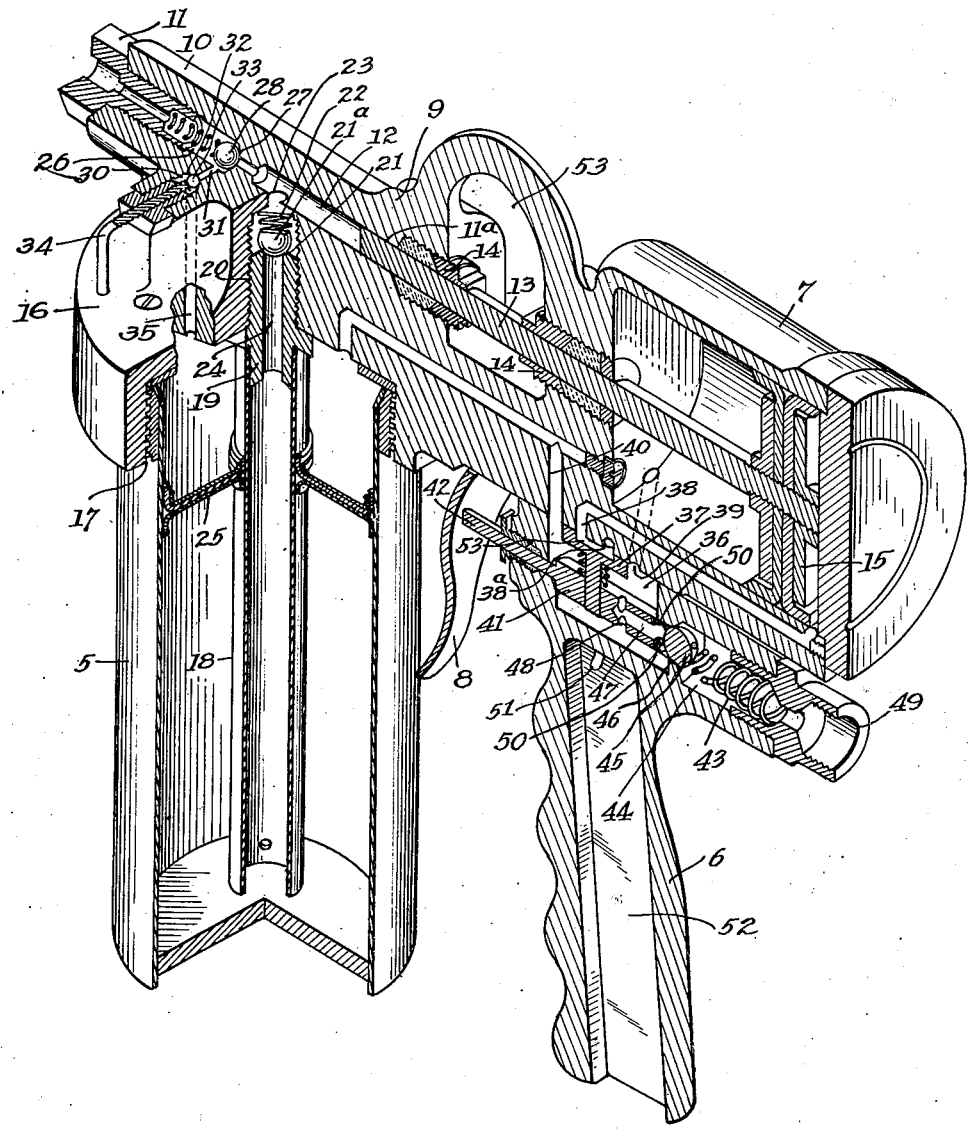
INVENTOR:
NEIL V. SMITH
BY
ATTORNEYS.

Patented Apr. 19, 1938

2,114,507

UNITED STATES PATENT OFFICE 2,114,507

GREASE GUN

Neil V. Smith, Los Angeles, Calif., assignor to Smith-Johnson Corporation, Los Angeles, Calif., a corporation of California Application September 19, 1931, Serial No. 563,864

16 Claims. (Cl. 221—47.3)

My invention relates to grease guns or lubricant handling devices for effectively forcing grease or other lubricant to machine parts to be lubricated preferably through grease connections or fittings commonly found on shackles and other parts of an automobile, and an object of the invention is to provide a novel combination and arrangement of parts and operating mechanisms, and means for effecting effective actuations thereof whereby a charge of lubricant is fed from a detachable container to a charge holder from which it is discharged to a connection or fitting under the force of a working pressure such as air, or the like, under pressure.

An important feature of the invention resides in the provision of a common actuating means for rendering the working parts or mechanisms of the device responsive and operative to insure a positive loading of the charge holder in advance of each charge expelling operation.

Another important object of the invention is to provide means for automatically lubricating the working parts of the mechanism such as the valves and moving parts, by an induced atomizing action which utilizes a portion of waste lubricant which I cause to be delivered back into the system at controlled periods during operations of the device.

A still further object of the invention is to provide a grease gun which is positive acting, and one which is of light weight and capable of convenient manipulation with one hand of the operator.

Another object of the invention is to provide a grease gun having means for quick interchangeability of lubricant supply containers, each adapted to carry a lubricant of a particular grade or character, depending upon the nature of the machine part to be lubricated.

The various objects and features of the invention will be best and fully understood from the following detailed description of a typical form and embodiment of the invention, throughout which description reference will be made to the accompanying drawing, in which:

The figure is a sectional perspective view of a lubricant gun embodying my invention.

In carrying my invention into practice, I am mindful of the fact that lubricant or grease guns of the character in question, to be effective for manual manipulation, must be light of weight and the parts so balanced and co-ordinated that the gun can be operated in limited spaces and with great ease, speed and convenience. I, therefore, have provided a structure wherein the supply cylinder for the lubricant to be dispensed is normally vertical and in substantial parallelism with a hand grip and at right angles to cylinder and piston means provided for discharging grease charges from the gun. The supply cylinder is indicated at 5, the grip at 6 and the cylinder and piston means at 7, the latter being positioned directly above the grip where the load thereof is nicely sustained by the hand and without unduly tiring the operator during the handling of the gun. There is a space between the front of the grip 6 and the supply cylinder 5 for free accommodation of the fingers and for enabling the index finger to be pressed against a pivoted trigger 8 located between the grip and the cylinder 5.

A body structure 9 is formed integral with the forward end of the cylinder 7 and is provided with a forward projecting portion 10 into which a hose fitting 11, or the like, is threadedly connected. The structure 9 has a longitudinal bore 11a the forward end of which forms what I shall hereinafter call a charge holder 12. This bore 11a is axially aligned with the cylinder 7 and operatively carries a charge ejector 13 adapted to be operated into the charge holder and against a charge of grease contained therein. The ejector 13 passes through suitable spaced packing glands 14, 14, where it enters the cylinder 7 and the structure 9. The ejector 13 passes into the cylinder 7 where it has threaded connection with the piston 15 operable in the cylinder.

A cap 16 is formed at the lower side of the body structure 9 and has threads 17 for making connection with the upper end of the cylinder 5. The cylinder extends downwardly from the cap 16 to a point about opposite the lower end of the grip and is closed at its lower end. Within the cylinder 5 is a tube 18, the lower end of which is open and positioned adjacent the bottom of the cylinder, while the upper end thereof is attached to a fitting 19. The fitting 19 is threaded into a passage 20 in the cap 16 and its upper end is formed with a valve seat 21 on which a ball valve 21a is normally seated under the yielding force of a spring 22. The charge holder 12 is connected with the upper end of the passage 20 by way of a supply port 23. The fitting 19 has a longitudinal bore 24 closed at its upper end by said valve 21a and open at its lower end to be in constant communication with the tube 18. A piston 25 is slidable on the tube 18 and in the cylinder 5 to work against the supply of grease in the cylinder below the piston and effect delivery of a charge to the holder 12.

The structure 9 at a point between the forward end of the charge holder 12 and the rear end of the fitting 11 is provided with a valve chamber 26 connected with the charge holder by a small port. A seat is provided at the forward end of the small port and a spring pressed ball valve 28 normally engages the seat. The chamber 26 communicates with a laterally projecting chamber 30 through a restricted portway 31. Valve seat 32 is provided where the chamber 30 joins the portway 31 and a ball valve 33 in the chamber 30 is normally held against the seat 32 by a manually controlled screw 34. The valve 33 closes the portway 31 and normally prevents passage of lubricant between the chamber 26 and a bleed port 35 in the cap 16. This port 35 passes into the cylinder 5 at a point above the piston 25, so that when the valve 33 is opened pressure may be relieved from the fitting 11 to facilitate removal of a hose or the like from a part to which it may be connected. When the valve 33 is opened a small portion of the grease contained in the hose and the fitting will be delivered into said cylinder 5 above the piston 25. This grease is later atomized by the action of air under pressure from portway 40 and acts to lubricate the working parts of the gun.

Formed between the upper end of the hand grip 6 and the lower side of the cylinder 7 is a valve chamber 36 carrying a slide valve 37 which is normally held yieldingly against the lower side of the cylinder 7 and is adapted to co-act with ports 38, 38a, and 39. The port 38 leads to one end of the cylinder 7 and the port 39 leads to the opposite end thereof. The body structure 9 is provided with a port 40 which extends from the chamber 36 to the lower side of the cap 16 where it communicates with the upper end of the container 5. The port 40 communicates with the chamber 36 at a point spaced from ports 38 and 38a and is not under the direct control of the slide valve 37. When the parts are in their normal positions shown in the accompanying drawing, the port 39 is uncovered and the piston 15 is in position so that the ejector 13 is retracted from the charge holder 12. It will also be noted that the port 40 is at all times in direct communication with the chamber 36. A member 41 operates in the chamber 36 and has a stem 42 which normally rests against the inner face of the trigger 8. This position of the member 41 is normally maintained by a spring 43 in a valve chamber 44. The spring 43 presses against a ball valve 45 to normally urge the same against its seat 46 between chambers 36 and 44. The member 41 has a longitudinal bore 47 which opens toward the ball valve 45, and, as illustrated, it is provided with lateral ports 48 which connect the bore 47 with the chamber 36. The chamber 44 is provided with a fitting 49 adapted to be connected in a line leading from a source of air supply, not shown. The walls of the member 41 facing the ball valve 45 are formed with slots 50 adapted to permit air from chamber 44 to enter the chamber 36 when the valve 45 is pushed away from its seat 46 by member 41 being operated by the trigger 8 being depressed.

The port 38a by means of which air may be exhausted from the cylinder 7 terminates at 51 at a point within the hollow portion 52 of the grip 6. The grip is open at its lower end. It should be noted that the slide valve 37 is cupped at 53 so that port 38a communicates with the port 39 when the valve is in the operated position, thus permitting the air to be exhausted from the cylinder 7 on the forward stroke of the piston 15.

Having described a construction embodying the invention I will now give a brief description of the operation of the structure described. Let it be assumed that the cylinder 5 is filled with grease below piston 25 and that the piston 25 occupies the position shown in the drawing. All of the parts illustrated in the drawing are shown unactuated or in the positions in which they will be when the trigger 8 is in the forward position. Assume also that the fitting 11 has been operatively connected with a hose of any suitable well-known construction for transmitting grease to the part or parts to be lubricated and that the connection 49 is operatively connected in a source of air, or the like, under pressure. The grip or handle 6 is held firmly in one hand of the operator, preferably with the index finger positioned forwardly of and against the trigger 8. The trigger 8 is then pressed against the stem 42 so as to cause rearward movement of the member 41. Normally the end of the member 41 onto which the portway 47 opens is spaced from the valve seat 46 so that a sealed connection is formed at the seat by the ball 45. When the member 41 is operated rearwardly it engages the ball valve 45 and presses it away from its seat 46 so as to permit air from the source of supply to enter the chamber 36. The moment the ball valve 45 is moved away from its seat, air enters the chamber 36 by way of the portways 47 and 48, and then passes into the portway 40 and is discharged into the cylinder 5 above the piston 25, thereby exerting a force against the piston, and, in turn, a pressure against the body of grease contained therebeneath. The force on the piston causes a column of grease to be forced up through the tube 18 so that grease passes the valve 22 and enters the charge holder 12. When the member 41 has been moved a substantial amount, the slide valve 37 will move across the port 38 opening it directly to the chamber 36 and simultaneously therewith the said valve will close over the portway 39 until the latter coincides with the cupped portion of said valve. Thus with the final movement of member 41 air is permitted to pass into the portway 38 from the chamber 36 and to enter the cylinder 7 behind the piston 15. The air operates piston 15 so as to move the ejector 13 in a forward direction and against the charge of grease in the holder 12. In so doing, the grease in the charge holder is forced past the ball valve 28 and is effectively forced into the hose, or the like, to which the fitting 11 is connected. As the trigger 8 is repeatedly depressed and released, successive charges of grease are supplied to and then ejected from the holder 12. The moment the trigger is released, the valve 37 is returned to its normal position to thereby cause an instantaneous closing of the valve 45 against its seat, thus checking the discharge of air into the chamber 36 from the source of supply. In practice the trigger 8 may first be pivoted only sufficiently to cause unseating of the valve 45 so that grease in the container is put under pressure and the trigger may be prevented from returning to its normal position when it is oscillated or pivoted to cause successive actuations of the ejecting mechanism. When the device is operated in this manner the piston 25 is continuously under pressure so that it forces charges of grease to the holder 12 during the return strokes of the plunger 13.

After the device has been used as just described, and it is desired to separate the hose from the part lubricated, the pressure in the hose may be relieved by turning the screw 34 until the ball has uncovered the port 35. Sufficient grease to lower the high pressure existing in the hose is then suddenly bled into the cylinder 5 at a point above the piston 25 and there may be carried therewith certain of the surplus grease which was contained in the hose. This grease is impinged upon by the air entering by way of portway 40 and thus forms a lubricant mist which finds entrance to the valve chamber 36 by way of the port 40. There is a dual reason for this releasing of the grease from the hose of fitting 11, the first being to facilitate the removal of the hose from the part just lubricated, and the second being to employ the waste grease which is bled from the hose to automatically lubricate the moving parts of the mechanism in said valve chamber 36.

The device is preferably formed with a U-shaped bail 53 between the forward end of cylinder 7 and the rear portion of the body structure 9 to form a part by means of which the device may be hung upon a suitable support when not in use. The construction of this bail is such as to leave the packing glands 14, 14 exposed so that they can be conveniently adjusted to insure proper packing connections between the glands and the ejector 13.

It is important to note that the supply cylinder 5 is readily detachable from the cap 16 through the threaded connection 17 making it possible to quickly and easily remove the cylinder for refilling or replacement. In practice, a single device with several cylinders 5 can be successfully used to handle several different forms or grades of lubricant.

Having described only a typically preferred form of my invention, I do not wish to limit myself to the specific details set forth, but wish to reserve to myself any changes or variations that may appear to those skilled in the art or fall within the scope of the following claims.

What is claimed is:

1. A grease gun including a holder for a charge of grease, means leading from the holder to permit the charge to be ejected therefrom, mechanisms for pneumatically supplying the holder with a charge of grease and for ejecting the charge therefrom, said mechanisms each characterized by a working cylinder having a reciprocating piston, and a valved connection between the cylinders and a source of air supply to cause the piston of the supplying mechanism to be operated in advance of the piston of the ejecting mechanism by the action of air admitted to the connection and to maintain the cylinder of the supplying mechanism in communication with the source of air supply during operation of the ejecting mechanism.

2. A grease gun including a holder for a charge of grease, means for delivering a charge of grease to the holder, means for forcing the charge from the holder, means for operating the delivering means and the forcing means, and a single controlling mechanism included in the operating means for actuating the delivering means to conduct a charge to the holder and for then actuating the forcing means to eject the charge from the holder and to act on the delivering means continuously during successive actuation of the forcing means.

3. A grease gun comprising a structure having a holder for a charge of grease, pneumatically actuated means for charging the holder and including a cylinder and a piston movably mounted therein, means connecting the holder with the cylinder to permit grease to flow from the latter to the former, pneumatically controlled means for ejecting a charge from the holder, a valve mechanism for connecting the pneumatically controlled means with a source of air supply, a grease discharge fitting connected with the holder, the structure including a portway between the charging means and the ejecting means and the valve mechanism, and means for opening the fitting to the cylinder of the charging means and for causing waste portions of grease to forcibly impinge against the piston thereof and to be thereby atomized and thence flow through said portway and to be spent against the valve mechanism and thereby automatically lubricate same.

4. A grease gun characterized by a charge ejecting mechanism of elongated form including a charge holder, and an externally packed plunger operable in the holder, a grease holding assembly operatively connected with the charge ejecting mechanism to successively conduct grease charges to its holder, said assembly including a grease container extending from the ejecting mechanism at an angle to the long axis thereof at one end of the mechanism, a handle extending from the charge ejecting mechanism at a point spaced inwardly from the opposite end thereof and disposed in substantial parallelism with the said container, and means for forcing grease into the charge holding mechanism from said container and for then ejecting the charge from said holder.

5. A grease gun characterized by a charge ejecting mechanism of elongated form, a grease holding assembly operatively connected with the charge ejecting mechanism to successively conduct grease charges thereto, said assembly including a grease container extending from the ejecting mechanism at an angle to the long axis thereof at one end of the mechanism, a handle extending from the charge ejecting mechanism adjacent to the opposite end thereof and disposed in substantial parallelism with the said container, means for forcing grease into the charge holding mechanism from said container and for then ejecting the charge from said holder, and means detachably connecting the container with the grease holding assembly including a single threaded connection forming the sole connection between the container and said assembly.

6. A grease gun comprising a holder for a charge of grease, means for delivering a charge of grease to the holder, means for forcing a charge from the holder, means for operating the delivering means and the forcing means, a controlling mechanism co-operable with the operating means for first actuating the delivering means, and then the forcing means, the forcing means embodying a cylinder having a reciprocal piston, an ejector carried by the piston and adapted to move through the holder and against a contained charge of grease therein, the said controlling means including a valve mechanism for alternately introducing air under pressure to the opposite ends of said cylinder and against the opposite faces of said piston.

7. A grease gun comprising a holder for a charge of grease, a container for a supply of grease connected therewith, means having a portway extending from the container to the holder, and fluid pressure actuated means including a plunger operable to eject a charge of grease from the holder, and a control valve for opening the container to a fluid pressure source to first exert pressure upon the grease in the container and thereby deliver a charge thereof into the holder and for then directing fluid pressure against the plunger to operate it in the holder to eject the charge therefrom and for then causing the plunger to be returned by the fluid pressure, the container remaining in communication with the pressure source during the return of the plunger whereby the next charge of grease is delivered to the holder.

8. A grease gun comprising, a body having a holder for a charge of grease, mechanism for delivering a grease charge thereto, mechanism for ejecting a charge from the holder, the body including a cap having a valve controlled ported connection with the charge holder, a common controlling means for both said mechanisms, in combination with a grease container open at one end and integrally closed at its other and provided with means at its open end for separable connection with said cap.

9. A grease gun organization comprising a fluid pressure actuated grease containing and transferring mechanism and a fluid pressure actuated charge holding and ejecting mechanism, the latter having co-operable connection with the former, means for establishing connection with a fluid pressure supply source, and a set of co-operable valves co-operable with the aforestated respective mechanisms and with said means for conducting fluid pressure to continuously supply actuating fluid pressure to said former of said respective mechanisms during the entire cycle of operation of the other mechanism.

10. A grease gun organization comprising a fluid pressure actuated grease containing and transferring mechanism and a fluid pressure actuated charge holding and ejecting mechanism, the latter having co-operable connection with the former, means for establishing connection with a fluid pressure supply source, and a set of co-operable valves co-operable with the aforestated respective mechanisms and with said means for conducting fluid pressure to said respective mechanisms, one of said valves adapted to open the first mentioned mechanism to the fluid pressure source, the other valve being operable to connect the other mechanism with the fluid pressure source only when the first mentioned valve is open.

11. In a lubricating device of the character described, a body, a hand grip depending from the body, a lubricant container removably attached to the body to depend therefrom in substantial parallelism to the hand grip, means for delivering lubricant from the container into the body, a plunger operable to eject lubricant from the body, and a cylinder and piston mechanism on the body above the hand grip for operating the plunger, the center of gravity of the mechanism being at the opposite side of the hand grip from the container.

12. In a lubricating device of the character described, a body, a hand grip depending from the body, a lubricant container removably attached to the forward end portion of the body to depend therefrom in substantial parallelism to the hand grip, fluid pressure actuated means in the container for forcing lubricant from the container into the body, means in the body for ejecting lubricant from the body, and cylinder and piston means on the body above the hand grip for operating the last mentioned means, the cylinder and piston means projecting from the rear end of the body beyond the hand grip to counterbalance the weight of the container.

13. In a lubricating device of the character described, a body, a hand grip depending from the body, a lubricant container removably attached to the body to depend therefrom forward of and in substantial parallelism to the hand grip, means for forcing lubricant from the container into the body, means in the body substantially directly above the container for ejecting lubricant from the body, and means on the body above the hand grip for operating the last mentioned means, the last mentioned means having its center of gravity spaced rearwardly from the hand grip.

14. A grease gun including, a body having a holder for a charge of lubricant, there being a discharge for the holder, a plunger for ejecting the lubricant from the chamber holder, a cylinder and piston mechanism for operating the plunger, fluid pressure actuated means for delivering lubricant to the holder, and a single control operable to alternately admit fluid pressure to the opposite ends of the cylinder of said mechanism to actuate the plunger and to continuously supply fluid pressure to said fluid pressure actuated means whereby it supplies charges of lubricant to the holder during the return strokes of the plunger.

15. In a grease gun, a body having a holder for a charge of grease, fluid pressure actuated means in the body for ejecting grease from the holder, a lubricant container detachably connected to the body to depend therefrom, a valved fluid connection between the container and holder, fluid pressure actuated means for delivering grease from the container to the holder, a hand grip depending from the body at a point spaced from the container, and an operating control for connecting the fluid pressure actuated means with a source of fluid pressure to actuate said means, the control including a manually operable control member between the container and hand grip.

16. A grease gun including, a body having a holder for a charge of grease, fluid pressure actuated means carried by the body for delivering grease to the holder, a plunger for ejecting grease from the holder, a cylinder and piston mechanism on the body for operating the plunger, the body having a valve chamber, a port extending from the chamber to said fluid pressure actuated means and ports connecting the opposite ends of the cylinder of the mechanism with the chamber, a connection on the body for connecting with a source of fluid pressure, a valve normally closing communication between the valve chamber and said connection, an operating stem adapted to open said valve to admit fluid pressure through the valve chamber and the first mentioned port to the fluid pressure actuated means to operate the same, there being an exhaust port in the body, and a valve operable by the stem to alternately connect said ports with the chamber and exhaust port to actuate the cylinder and piston means.

NEIL V. SMITH.